Nov. 4, 1924.  1,513,991
A. E. HOMAN ET AL
VEHICLE BUMPER
Filed March 4, 1922   2 Sheets-Sheet 2
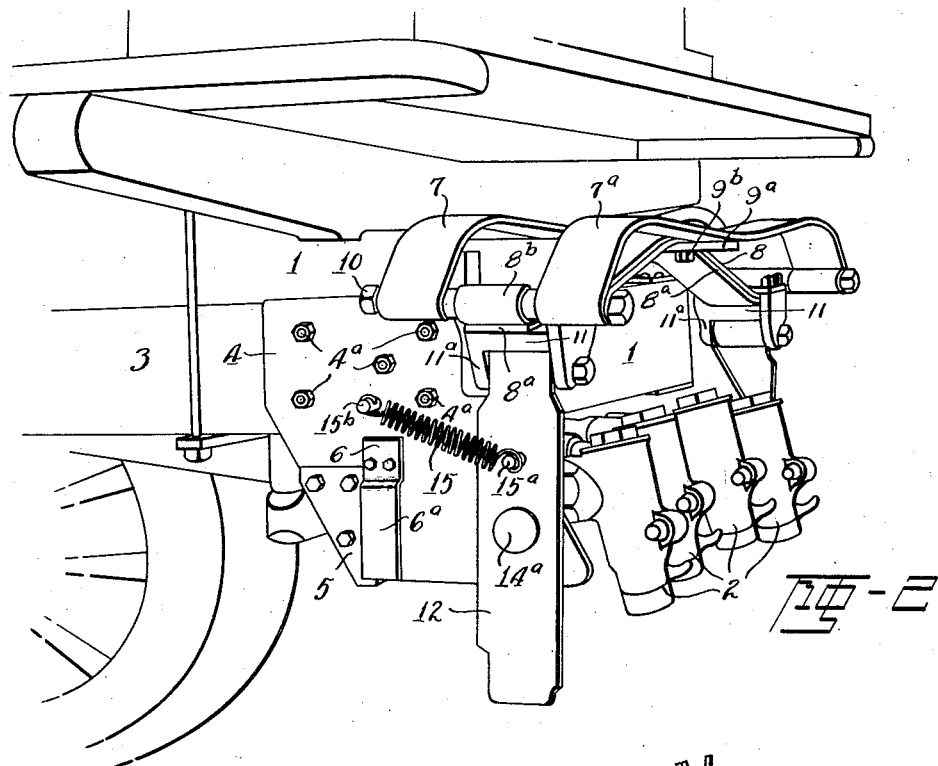
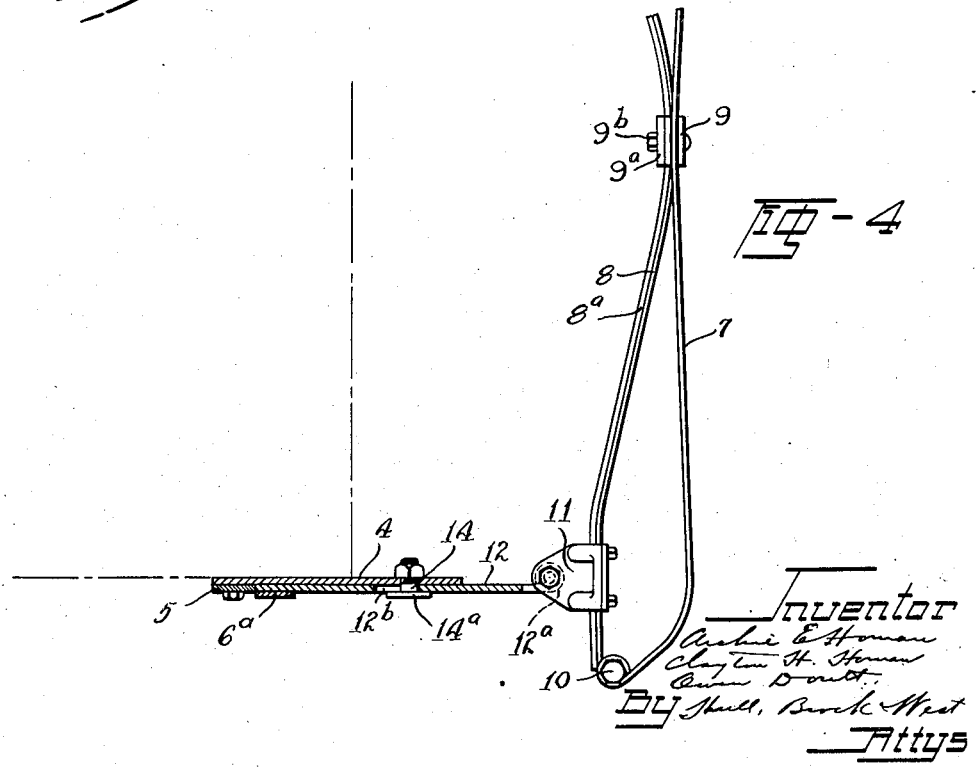

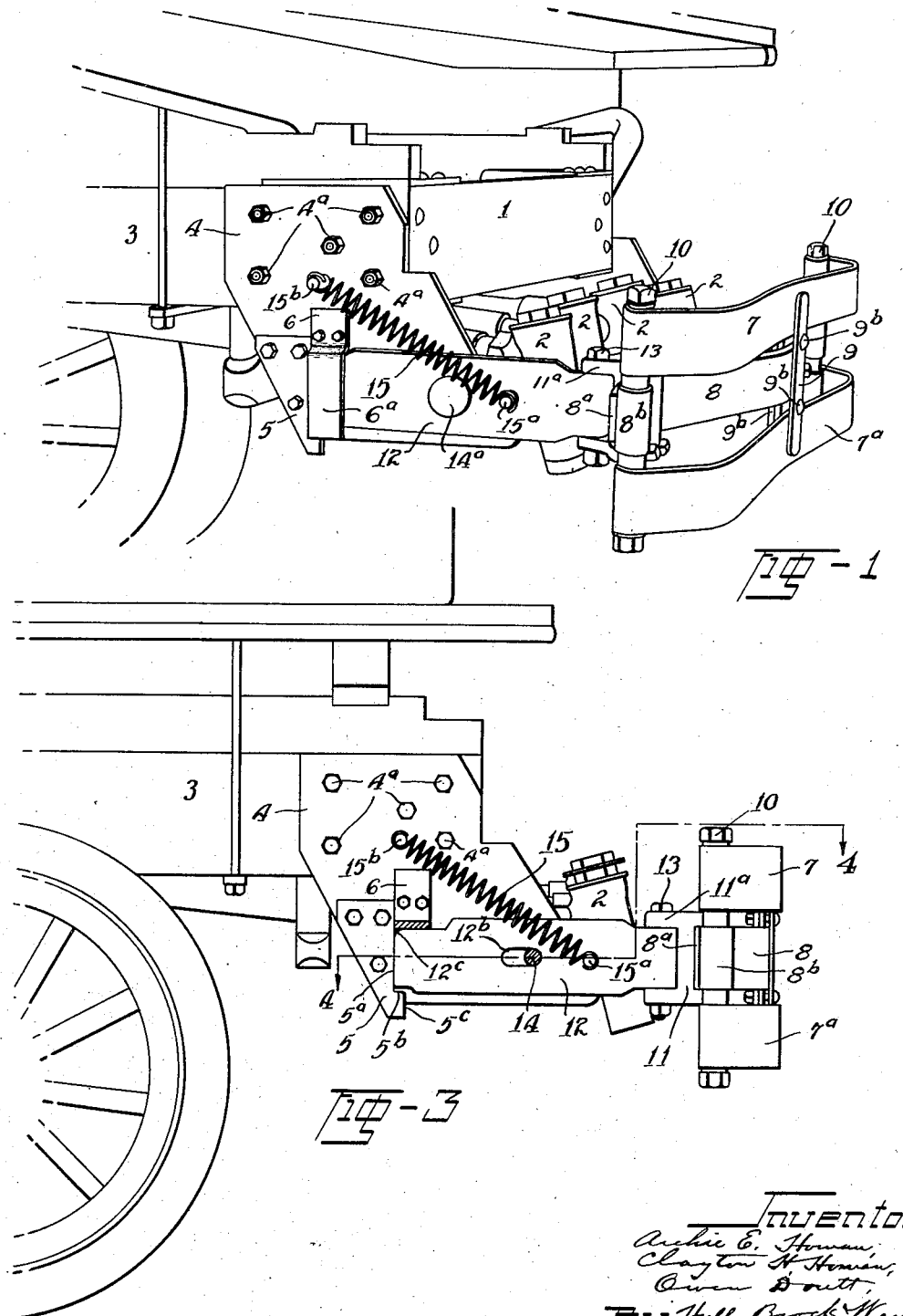

Patented Nov. 4, 1924.

1,513,991

UNITED STATES PATENT OFFICE.

ARCHIE E. HOMAN, OF CLEVELAND, CLAYTON H. HOMAN, OF LAKEWOOD, OHIO, AND OWEN DOUTT, OF DETROIT, MICHIGAN, ASSIGNORS, BY MESNE ASSIGNMENTS, TO THE C. G. SPRING & BUMPER COMPANY, OF DETROIT, MICHIGAN, A CORPORATION OF DELAWARE.

VEHICLE BUMPER.

Application filed March 4, 1922. Serial No. 541,259.

*To all whom it may concern:*

Be it known that we, ARCHIE E. HOMAN, CLAYTON H. HOMAN, and OWEN DOUTT, citizens of the United States, residing at Cleveland and Lakewood, in the county of Cuyahoga and State of Ohio, and Detroit, in the county of Wayne and State of Michigan, respectively, have invented a certain new and useful Improvement in Vehicle Bumpers, of which the following is a full, clear, and exact description, reference being had to the accompanying drawings.

This invention relates to bumpers for automobiles and similar vehicles, and has for its general object to improve the construction of such bumpers as well as to provide an improved means for mounting and supporting such bumpers whereby they may be conveniently moved from their protecting position to some other position without detaching them from the parts of the vehicle to which they are connected. Further and more limited objects of the invention will be set forth hereinafter in connection with the specification and will be attained in and through the combinations of elements embodied in the claims.

In the embodiment of the invention disclosed herein, the bumper is employed for the purpose of protecting the faucets of "tank wagons" or trucks and is so mounted as to be conveniently swung out of this protecting position when it is desired to obtain access to such faucets. Furthermore, the bumper is so constructed as to withstand all ordinary incidents of use due to its employment with heavy vehicles of the character employed for such tank wagons or trucks.

In the drawings forming part hereof, Fig. 1 represents a perspective view of the rear portion of a tank wagon or truck having our bumper applied thereto, the bumper being in its operative or protecting position; Fig. 2 a similar view, with the bumper swung upwardly out of its protecting position; Fig. 3 a sectional side elevation of the parts shown in Fig. 1; and Fig. 4, a sectional view corresponding to the line 4—4 of Fig. 3.

Describing by reference characters the various parts illustrated herein, 1 denotes generally the rear portion of a "tank wagon," the same being provided with a plurality of spigots 2, as is customary with vehicles of this character. Secured to the rear ends of the side frames 3 are supporting plates or brackets 4, each supporting plate or bracket extending downwardly and rearwardly from its side frame member. At the front lower end, each plate or bracket 4 is provided with an abutment, this abutment being conveniently and cheaply formed by bolting or riveting thereto a plate 5. At the rear of the plate 5, there is secured to each of the plates or brackets 4 a keeper, conveniently formed by a plate having a base portion 6, which is secured to its appropriate plate or bracket 4, and an outwardly off-set portion $6^a$ extending parallel with the plate 4 and providing therewith an open-bottomed slot. Each keeper is secured to its plate or bracket 4 immediately at the rear of the abutment plate 5, each of said abutment plates having a vertical abutting edge $5^a$ beneath which is a rearwardly extending shoulder $5^b$.

The brackets or plates 4 may be of any desired shape and may be fastened to their respective frame members by means of bolts $4^a$. The rear ends of the brackets extend in proximity to the spigots 2 and each provides a pivotal support for the arms which carry the bumper.

The bumper shown herein is of the wide-face or "twin bar" type, such as shown in McGregor Patent #1,372,154 granted March 22, 1921, and comprises generally an upper impact bar 7 and a lower impact bar $7^a$ and an intermediate bar formed of two spring plates 8, $8^a$, the central portions of the said bars being connected by means of plates 9 and $9^a$ and bolts or rivets $9^b$. The ends of the plate 7, $7^a$ and 8, $8^a$ are connected by means of vertical bolts 10 extending through eyes in the ends of the plates 7, $7^a$ and eyes $8^b$ in the ends of the plate 8, located between the eyes of the impact plates. The plates 8 and $8^a$ are of such width and gauge as to be jointly of substantially the same strength of the impact plates, the said plates 8, $8^a$ being connected at their ends by combined clamps and supporting arms 11 and at their centers by the plates 9, $9^a$ and the bolts or rivets $9^b$. By employing two spring plates for the "rear" or intermediate portion of the bumper, it is possible to make their combined strength equal to that of the two "front" or impact plates 7, $7^a$ and to secure this result without exceeding the elastic limits of the plates 8, 8ª under the incidents of use.

The front end of each of the arms 11 is pivotally mounted upon the end of a supporting arm 12, as by means of a bolt 13 extending through top and bottom lugs 11ª of the arm 11 and through an eye 12ª on the adjacent end of the arm 12. Each of the arms 12 is provided with a slot 12ᵇ by means of which it is pivotally and reciprocably mounted upon its cooperating plate or bracket 4 by means of a bolt or rivet 14 mounted in said plate or bracket and extending through said slot and having a head 14ª adapted to bridge the slot. This construction constitutes a "pin-and-slot" lost-motion connection between the brackets 4 and the arms 12. The end of each arm which is remote from the bumper is reduced, if necessary, in order to enter the slot provided between the keeper 6, 6ª and the plate or bracket 4, with its lower end above the shoulder 5ᵇ and its front or remote end abutting against the surface 5ª, each arm 12 being normally held in such abutting position by means of a spring 15 connected at one end to said arm, as indicated at 15ª, and at its other end to the plate or bracket 4, as indicated at 15ᵇ. The springs 15 are so arranged as to exert mainly a pull in the direction of the lengths of their respective arms holding the front ends of their respective arms in the locking seats formed by the keepers and the parts 5ª, 5ᵇ; and the bolts 14 and slots 12ᵇ are so arranged that the thrust due to the impact of the bumper with any object will be distributed between the plates or brackets 4 and the abutting plates 5, the bolts bearing against the rear ends of their respective slots when the front ends of the arms abut against the plates 5.

It will be observed that the springs 15 exercise but a slight lifting effort upon the arms 12 and that vertical movement of the bumper is normally prevented by means of the keepers and the shoulders 5ᵇ. It will also be observed that the bumper is of sufficient vertical extent to protect the spigots 2 against impact. When it is desired to operate the spigots, the operator first pulls rearwardly upon the bumper until the rear ends of the arms can clear the shoulders 5ᵇ, after which the bumper will be swung upon the bolts 14 as pivots and into the vertical position shown in Fig. 2. When in this position, the springs 15 are not under any material tension and, should the operator forget to lower the bumper after operating the spigots, the inertia due to starting the vehicle or to other causes will be sufficient to overbalance the bumper rearwardly, and it will automatically drop to operative position, the springs 15 serving to cushion the final descent of the bumper to operative position and to restore the arms 12 to their former locked position. To permit the proper positioning of these parts under this action, the upper front edge or corner of each plate 12 is rounded, as shown at 12ᶜ, whereby on impact with the vertical face 5ᶜ below the shoulder 5ᵇ, each arm will continue its rocking movement about its pivot 14 and will enable the springs to move them back into the locked operative positions shown in Figs. 1, 2 and 4.

Having thus described our invention, what we claim is:

1. A bumper comprising an impact section having a pair of substantially parallel bars and a bar interposed between the first mentioned bars and having its ends connected to the ends of said bars and its central portion connected to the central portions of such first mentioned bars, the intermediate bar comprising a pair of spring plates the combined strength whereof is substantially equal to the combined strength of the first mentioned bars.

2. A bumper comprising an impact section having a pair of substantially parallel bars and an intermediate bar interposed between the first mentioned bars and having its ends connected to the ends of said bars and its central portion connected to the central portions of said bars, the intermediate bar comprising a pair of spring plates connected together at their central portions and adjacent to their ends, the combined strength of the plates of the intermediate section being substantially equal to the combined strength of the first mentioned bars.

3. The combination, with a vehicle, of a bumper, arms connected to said bumper, locking means for said arms carried by said vehicle and adapted to disengage the arms through a movement of the latter away from said vehicle, and a lost-motion connection between each of said arms and said vehicle permitting such movement of said arms away from said vehicle.

4. The combination, with a vehicle, of a bumper, arms connected to said bumper, locking means carried by said vehicle and cooperating with said arms normally to lock the bumper against vertical movement, and a lost-motion pivotal connection between each of said arms and said vehicle permitting the disengagement of the arms from the locking means through movement of the arms and bumper away from said vehicle.

5. The combination, with a vehicle, of a bumper, arms connected to said bumper, a pin-and-slot connection between each of said arms and said vehicle, and means cooperating with the ends of the arms remote from said bumper for normally locking the arms and the bumper against vertical movement.

6. The combination, with a vehicle, of a bumper, arms connected to said bumper, means including a pin, and a slot extending in the direction of impact, for pivotally connecting each of said arms to said vehicle, and means cooperating with each of said arms for locking the same and the bumper against such pivotal movement and adapted to disengage said arms through movement of the same in such direction of impact.

7. The combination, with a vehicle, of a bumper, arms connected to said bumper, means including a pin, and a slot extending in the direction of impact, for pivotally connecting each of said arms to said vehicle, an abutment for the end of each arm which is remote from the bumper, a keeper adjacent to each abutment and adapted to normally prevent movement of each arm about its pin as a pivot, the pins and the slots being so arranged that the thrust due to the impact of the bumper will be distributed between said abutments and the pin-and-slot connections.

8. The combination, with a vehicle, of a bumper, arms connected to said bumper, means including a pin, and a slot extending in the direction of impact, for pivotally connecting each of said arms to said vehicle, means cooperating with each of said arms for locking the same and the bumper against such pivotal movement and adapted to disengage said arm through movement of the same in such direction of impact, and a spring connected with each of said arms and tending to hold the same in engagement with its locking means.

9. The combination, with a vehicle, of a bumper support on each side of said vehicle, a bumper, supporting arms connected to and extending from said bumper, a pin carried by each of said supports, a slot in each of said arms cooperating with a pin and extending in the direction of impact, means cooperating with the inner end of each of said arms to prevent pivotal movement thereof about its pin, and a spring connected with each of said supports and with each of said arms at a point between the pivotal support therefor and the bumper.

10. The combination, with a vehicle, of a bumper support on each side of said vehicle, a bumper, supporting arms connected to and extending from said bumper, a pin carried by each of said supports, a slot in each of said arms cooperating with a pin and extending in the direction of impact, means cooperating with the inner end of each of said arms to prevent pivotal movement thereof about its pin, and a spring connected with each of said supports and with each of said arms.

11. The combination, with a vehicle, of a bumper support on each side of said vehicle, a bumper, supporting arms connected to and extending from said bumper, a pin-and-slot connection between each of said arms and a support, the slot extending in the direction of impact, a keeper having a locking seat for the end of each arm which is remote from said bumper, and a spring connected with, each of said arms and normally holding the inner end of each arm within its seat.

12. The combination, with a vehicle, of a bumper support on each side of said vehicle, a bumper, supporting arms connected to and extending from said bumper, a pin and slot connection between each of said arms and a support, the slot extending in the direction of impact, a keeper having a locking seat for the inner end of each arm, a spring connected with each of said arms and normally holding the inner end of each arm within its seat, and an abutment for the inner end of each arm and serving, with the pin-and-slot connection, to distribute the shock of impact.

13. The combination, with a vehicle, of a bumper support on each side of said vehicle, a bumper, supporting arms connected to and extending from said bumper, a pin and slot connection between each of said arms and a support, the slot extending in the direction of impact, a keeper having a locking seat for the inner end of each arm, and an abutment for the inner end of each arm and serving, with the pin-and-slot-connection, to distribute the shock of impact.

In testimony whereof, we hereunto affix our signatures.

ARCHIE E. HOMAN.
CLAYTON H. HOMAN.
OWEN DOUTT.